United States Patent [19]

Katono et al.

[11] Patent Number: 5,759,448
[45] Date of Patent: Jun. 2, 1998

[54] PLASTIC OPTICAL MATERIAL

[75] Inventors: Hiroki Katono; Masuhiro Shouji; Takeo Ogihara; Teruo Sakagami, all of Iwaki, Japan

[73] Assignee: Kureha Kagaku Kogyo Kabushiki Kaisha, Tokyo, Japan

[21] Appl. No.: 738,311

[22] Filed: Oct. 25, 1996

[30] Foreign Application Priority Data

Nov. 8, 1995 [JP] Japan ................................. 7-289628

[51] Int. Cl.$^6$ ........................................................... F21V 9/00
[52] U.S. Cl. ............................................. 252/582; 359/885
[58] Field of Search ................................. 252/582, 587; 359/885

[56] References Cited

U.S. PATENT DOCUMENTS

| | | | |
|---|---|---|---|
| 4,504,616 | 3/1985 | Uehara et al. | |
| 4,563,494 | 1/1986 | Ida | 524/398 |
| 5,413,971 | 5/1995 | McPherson | 252/582 |
| 5,466,775 | 11/1995 | Sakagami et al. | 359/885 |
| 5,567,778 | 10/1996 | Saka Gami et al. | 359/885 |
| 5,611,965 | 3/1997 | Shouji et al. | 252/582 |

FOREIGN PATENT DOCUMENTS

| | | |
|---|---|---|
| 5-202109 | 8/1993 | Japan . |
| 6-122803 | 5/1994 | Japan . |

*Primary Examiner*—Philip Tucker
*Attorney, Agent, or Firm*—Frishauf, Holtz, Goodman, Langer & Chick, P.C.

[57] ABSTRACT

Disclosed herein is a plastic optical material, which has excellent glare-proofness and transparency and is low in the degree of coloring.

The plastic optical material of the invention comprises a polymer containing a phosphate group and a trivalent neodymium ion therein, wherein the polymer further contains at least one metal ion selected from the group consisting of a trivalent praseodymium ion and a trivalent holmium ion.

The phosphate group may preferably be chemically bonded to a molecular structure constituting the polymer. In particularly, the polymer may preferably be a copolymer obtained by copolymerizing a monomer represented by the following formula I:

$$PO(OH)_n R_{3-n}$$

wherein R means a polymerizable functional group represented by the formula:

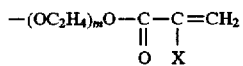

in which X denotes a hydrogen atom or a methyl group, and m is an integer of 0–5, and n is 1 or 2, and at least one monomer copolymerizable therewith.

12 Claims, No Drawings

PLASTIC OPTICAL MATERIAL

BACKGROUND OF THE INVENTION

1) Field of the Invention

The present invention relates to a plastic optical material, and more particularly to a plastic optical material which has the property of absorbing rays in specific wavelength ranges in a visible region, and is excellent in transparency and glare-proofness and suitable for use in spectacle lenses, various kinds of filters and the like.

2) Description of the Background Art

Attempts have heretofore been made to introduce a metal ion into a plastic material so as to impart optical properties specific to the metal ion to the plastic material.

As the plastic material used as a medium for this metal ion, acrylic polymers are widely used because they are excellent in optical properties such as transparency and mechanical properties such as strength.

As the metal ion used for imparting some specific optical properties to the plastic material, there has been known a neodymium ion having the property of absorbing rays in a wavelength range about 575 nm. Optical materials containing this neodymium ion have excellent glare-proofness and are hence used in glare-proof spectacle lenses, glare-proof filters for display devices composed of cathode-ray tubes and/or the like in televisions, computers, etc., luminance-controlling filters for lighting equipment, tone-compensating filters, etc.

However, the optical materials containing the neodymium ion are colored in purple because of the light absorption characteristic of the neodymium ion, so that it has been difficult to provide a substantially colorless optical material. For this reason, there has been a demand for development of a plastic optical material which has excellent glare-proofness and transparency and is low in the degree of coloring.

SUMMARY OF THE INVENTION

The present invention has been made in view of the foregoing circumstances and has as its object the provision of a plastic optical material which has excellent glare-proofness and transparency and is low in the degree of coloring.

It has been known that the eyeballs, which preside over visual functions of the human, each have three kinds of optic cells different from one another in response wavelength range, and these three kinds of optic cells each has a particular maximum response characteristic at a wavelength different from one an other. More specifically, the three kinds of optic cells are a blue-responding cell having response wavelength range of from 400 to 530 nm, a green-responding cell having response wavelength range of from 460 to 620 nm, and a red-responding cell having response wavelength range of from 450 to 700 nm. Their maximum response wavelengths are 450 nm for the blue-responding cell, 525 nm for the green-responding cell and 575 nm for the red-responding cell.

Accordingly, if the property of absorbing rays in three specific wavelength ranges respectively including the maximum response wavelengths of these three kinds of optic cells could be imparted in a well-balanced condition to an optical material, the optical material would be excellent in glare-proofness and is low in the degree of coloring.

The present inventors have found that, with using a neodymium ion in combination with a specific metal ion, light absorption characteristics in specific wavelength ranges can be controlled. The present invention has been led to completion on the basis of this finding.

According to the present invention, there is thus provided a plastic optical material comprising a polymer containing a phosphate group and a trivalent neodymium ion therein, wherein the polymer further contains at least one metal ion selected from the group consisting of a trivalent praseodymium ion and a trivalent holmium ion.

In the plastic optical material according to the present invention, the phosphate group may preferably be chemically bonded to a molecular structure constituting the polymer.

The polymer may preferably be a copolymer obtained by copolymerizing a monomer represented by the following formula I and at least one monomer copolymerizable therewith.

  (Formula I)

wherein R means a polymerizable functional group represented by the formula:

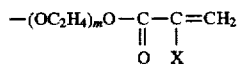

in which X denotes a hydrogen atom or a methyl group, and m is an integer of 0–5, and n is 1 or 2.

In the plastic optical material according to the present invention, the total content of the trivalent neodymium ion, the trivalent praseodymium ion and the trivalent holmium ion may preferably be 0.1–13 parts by mass per 100 parts by mass of the polymer. Further, a mass ratio of the neodymium ion to the total mass of the trivalent praseodymium ion and the trivalent holmium ion may preferably be 0.5–12.

The polymer constituting the plastic optical material according to the present invention contains the trivalent praseodymium ion and/or the trivalent holmium ion together with the trivalent neodymium ion, so that the light absorption characteristics in the vicinity of the maximum response wavelengths of 450 nm, 525 nm and 575 nm in the optic cells can be controlled by suitably adjusting the proportions of these metal ions. As a result, the plastic optical material according to the present invention comes to have excellent glare-proofness and transparency, and moreover becomes colorless or almost colorless because its degree of coloring is low.

Accordingly, the plastic optical material according to the present invention can be extremely suitably used in glare-proof spectacle lenses, glare-proof filters for display devices composed of cathode-ray tubes and/or the like in televisions, computers, etc., luminance-controlling filters for lighting equipment, tone-compensating filters, etc.

DETAILED DESCRIPTION OF THE INVENTION AND PREFERRED EMBODIMENTS

The plastic optical material according to the present invention will hereinafter be described in detail.

The plastic optical material according to the present invention comprises a polymer containing a phosphate group and a trivalent neodymium ion therein. The polymer further contains at least one metal ion selected from the group consisting of a trivalent praseodymium ion and a trivalent holmium ion.

The light absorption characteristics of the above metal ions were determined. As a result, it was found that the trivalent neodymium ion has a light-absorption peak at a wavelength of 525 nm in addition to that at a wavelength of 575 nm, the trivalent praseodymium ion has light-absorption peaks at wavelengths of 575 nm and 450 nm, and the trivalent holmium ion has light-absorption peaks at wavelengths of 525 nm and 450 nm. Accordingly, the light absorption characteristics in the vicinity of the maximum response wavelengths in the three kinds of optic cells, namely, wavelengths of 450 nm, 525 nm and 575 nm can be controlled by combining these metal ions in proper proportions.

The trivalent neodymium ion can be contained in the polymer in the form of a neodymium compound. As examples of the neodymium compound used as a source of the trivalent neodymium ion, may be mentioned anhydrides and hydrates of neodymium acetate, neodymium chloride, neodymium nitrate, neodymium oxide, neodymium-2,4-pentane-dionate, neodymium trifluoropentanedionate, neodymium fluoride, neodymium sulfate and the like. The neodymium compounds are not limited to these compounds only.

The trivalent praseodymium ion can be contained in the polymer in the form of a praseodymium compound. As examples of the praseodymium compound used as a source of the trivalent praseodymium ion, may be mentioned anhydrides and hydrates of praseodymium acetate, praseodymium chloride, praseodymium nitrate, praseodymium oxide, praseodymium-2,4-pentanedionate, praseodymium trifluoropentanedionate, praseodymium fluoride, praseodymium sulfate, praseodymium oxalate and the like. The praseodymium compounds are not limited to these compounds only.

The trivalent holmium ion can be contained in the polymer in the form of a holmium compound. As examples of the holmium compound used as a source of the trivalent holmium ion, may be mentioned anhydrides and hydrates of holmium acetate, holmium chloride, holmium nitrate, holmium oxide, holmium-2,4-pentanedionate, holmium trifluoropentane dionate, holmium fluoride, holmium sulfate, holmium oxalate and the like. The holmium compounds are not limited to these compounds only.

In the plastic optical material according to the present invention, other metal ions may be contained in the polymer in addition to the trivalent neodymium ion, the trivalent praseodymium ion and the trivalent holmium ion. As such other metal ions, there may be used ions of sodium, potassium, calcium, iron, manganese, cobalt, magnesium, nickel and the like. These metal ions may be contained in the polymer in the form of their corresponding metal compounds.

In the plastic optical material according to the present invention, the total content of the trivalent neodymium ion, the trivalent praseodymium ion and the trivalent holmium ion is preferably 0.1–13 parts by mass, particularly 0.3–11 parts by mass per 100 parts by mass of the polymer.

If this proportion is lower than 0.1 parts by mass, the resulting plastic optical material will be difficult to absorb rays in wavelength ranges in the vicinity of the respective maximum response wavelengths of 450 nm, 525 nm and 575 nm in the three kinds of optic cells in a well-balanced condition, so that the plastic optical material may not be provided as an optical material, which is low in the degree of coloring and has sufficient glare-proofness, in some cases. If the proportion exceeds 13 parts by mass on the other hand, it is difficult to uniformly disperse the metal compounds, which are sources of these metal ions, in the polymer.

In order to contain the metal ions in such a proportion, it is preferable that the total content of the metal compounds, which are sources of the metal ions, be 1–30 parts by mass, particularly 5–25 parts by mass per 100 parts by mass of the polymer.

In the plastic optical material according to the present invention, a mass ratio of the trivalent neodymium ion to the total mass of the trivalent praseodymium ion and the trivalent holmium ion is preferably 0.5–12, particularly 2–10.

If this mass ratio is lower than 0.5, a degree of coloring by the light absorption characteristics of the praseodymium ion and/or the holmium ion becomes higher. If this mass ratio exceeds 12 on the other hand, a degree of coloring by the light absorption characteristics of the neodymium ion becomes higher. In each case, it is difficult to obtain an almost colorless optical material. It is hence not preferable to contain the metal ions at any mass ratio outside the above range. Incidentally, when the trivalent praseodymium ion and the trivalent holmium ion are contained in combination, no particular limitation is imposed on their proportions.

In order to control the mass ratio of the trivalent neodymium ion to the total mass of the trivalent praseodymium ion and the trivalent holmium ion within the above range, it is preferable that a mass ratio of the neodymium compound to the total mass of the praseodymium compound and the holmium compound be 0.1–15, particularly 0.8–12.

The polymer constituting the plastic optical material according to the present invention contains a phosphate group together with the above-described metal ions. Here, the term "phosphate group" as used in the present invention means a group represented by the formula $PO(OH)_n$— (n being 1 or 2).

Such a phosphate group is contained in the polymer, so that the above metal ions are contained in the polymer in a state coordinated with the phosphate group. Therefore, it is desirable that the phosphate group be chemically bonded to the molecular structure of the polymer from the viewpoint of uniformly dispersing the metal ions in the polymer.

In the case where such a polymer with the phosphate group chemically bonded thereto is used, it is preferable that a proportion of the phosphate group contained in the polymer be 0.5–60 mass %, particularly 1–50 mass %.

If the proportion of the phosphate group is lower than 0.5 mass %, it is difficult to uniformly disperse the metal ions in the polymer. Therefore, no plastic optical material excellent in clearness can be provided. If this proportion exceeds 60 mass % on the other hand, it is difficult to disperse the metal compounds, which are sources of the metal ions, in the polymer.

As the polymer with the phosphate group chemically bonded thereto, it is preferable to use a copolymer (hereinafter referred to as "the specific acrylic copolymer") obtained by copolymerizing a monomer mixture composed of a monomer (hereinafter referred to as "the specific phosphate group-containing monomer") represented by the formula I as above and a monomer (hereinafter referred to as "the copolymerizable monomer") copolymerizable therewith.

In the formula I which represents a molecular structure of the specific phosphate group-containing monomer, the group R is an acryloyloxy group (in the case where X is a hydrogen atom) or a methacryloyloxy group (in the case where X is a methyl group) to which at least one ethylene oxide group has been bonded.

Here, the recurring number m of the ethylene oxide groups is an integer of 0–5. If the value of m exceeds 5, the resulting copolymer will become greatly lowered in hardness and hence lacking in practicability as an optical material.

The number n of the hydroxyl groups in the formula I is 1 or 2. The specific phosphate group-containing monomer in which the value of n is 1 and the specific phosphate group-containing monomer in which the value of n is 2 may be used either singly or in combination according to required properties of the resulting optical material, and the molding or forming process employed and intended end application thereof. When both monomers are used, their mixing proportions may be suitably selected.

More specifically, the specific phosphate group-containing monomer in which the value of n is 1 is a monomer in which the number of radical-polymerizable, ethylenically unsaturated bonds bonded to the phosphorus atom is 2, and has crosslink-polymerizability. On the other hand, in the specific phosphate group-containing monomer in which the value of n is 2, the number of the ethylenically unsaturated bonds is 1, and the number of hydroxyl groups bonded to the phosphorus atom is 2. Such a monomer is high in bonding ability to metal ions such as a neodymium ion.

Accordingly, in the case where the resulting optical material according to the present invention is subject to an injection molding process or extrusion process, which is a common molding or forming process for thermoplastic resins, it is preferable to use the specific phosphate group-containing monomer in which the number of n is 2.

On the other hand, when both the specific phosphate group-containing monomer in which the value of n is 1 and the specific phosphate group-containing monomer in which the value of n is 2 are used, it is preferable to use a cast polymerization process by which an optical article having the intended shape can be directly obtained upon the preparation of the specific acrylic copolymer.

As described above, any one of the specific phosphate group-containing monomer in which the value of n is 1 and the specific phosphate group-containing monomer in which the value of n is 2 may be selected according to required properties of the resulting optical material, and the molding or forming process employed and intended end application thereof. However, it is preferable to use both monomers. In particular, the combined use of the specific phosphate group-containing monomer in which the value of n is 1 and the specific phosphate group-containing monomer in which the value of n is 2 in a molar ratio substantially equal to each other, for example, in a molar ratio of 45:55 to 55:45, is preferred because the solubility of the metal compounds such as the neodymium compound and the like in the monomer mixture becomes high.

In order to obtain the specific acrylic copolymer, the monomer mixture composed of the specific phosphate group-containing monomer and the copolymerizable monomer is used. The use of such a monomer mixture permits the provision of an optical material high in hardness and excellent in hygroscopicity and form retention.

No particular limitation may be imposed on the copolymerizable monomer so far as it satisfies, for example, the following requirements:

(1) it can be uniformly mixed with the specific phosphate group-containing monomer used into a solution;
(2) it has good radical copolymerizability with the specific phosphate group-containing monomer used; and
(3) it can provide an optically transparent copolymer.

As specific examples of the copolymerizable monomer, may be mentioned monofunctional acrylates and monofunctional methacrylates such as lower alkyl acrylates and lower alkyl methacrylates the alkyl groups of which have 1–10 carbon atoms, such as methyl acrylate, methyl methacrylate, ethyl acrylate, ethyl methacrylate, n-butyl acrylate and n-butyl methacrylate, and modified alkyl acrylates and modified alkyl methacrylates such as glycidyl acrylate, glycidyl methacrylate, 2-hydroxyethyl acrylate, 2-hydroxyethyl methacrylate, 2-hydroxypropyl acrylate, 2-hydroxypropyl methacrylate, 2-hydroxybutyl acrylate and 2-hydroxybutyl methacrylate; polyfunctional acrylates and polyfunctional methacrylates such as ethylene glycol diacrylate, ethylene glycol dimethacrylate, diethylene glycol diacrylate, diethylene glycol dimethacrylate, polyethylene glycol diacrylate, polyethylene glycol dimethacrylate, 1,3-butylene glycol diacrylate, 1,3-butylene glycol dimethacrylate, 1,4-butanediol diacrylate, 1,4-butanediol dimethacrylate, 1,6-hexanediol diacrylate, 1,6-hexanediol dimethacrylate, neopentylglycol diacrylate, neopentylglycol dimethacrylate, 2-hydroxy-1,3-dimethacryloxy-propane, 2,2-bis[4-methacryloxyethoxyphenyl]propane, 2-hydroxy-1-acryloxy-3-methacryloxypropane, trimethylolpropane triacrylate, trimethylolpropane tri-methacrylate, pentaerythritol triacrylate, pentaerythritol trimethacrylate, pentaerythritol tetraacrylate and penta-erythritol tetramethacrylate.

Carboxylic acids having a radical-polymerizable unsaturated bond, such as acrylic acid, methacrylic acid, 2-methacryloyloxyethylsuccinic acid and 2-methacryloyloxyethylphthalic acid, and aromatic vinyl compounds such as styrene, α-methylstyrene, chlorostyrene, dibromostyrene, methoxystyrene, divinylstyrene, vinylbenzoic acid, hydroxymethylstyrene and trivinylbenzene may also be used.

These compounds may be used either singly or in any combination thereof.

A proportion of the specific phosphate group-containing monomer to the copolymerizable monomer to be used is preferably within a range of from 3:97 to 90:10, particularly from 30:70 to 80:20 in terms of a mass ratio.

Since the specific phosphate group-containing monomer is a monomer high in radical polymerizability, almost all the monomers in the monomer mixture can be considered to be converted into a copolymer by subjecting the monomer mixture to a polymerization treatment. Therefore, when the specific phosphate group-containing monomer and the copolymerizable monomer are used in proportions within the above range, an acrylic copolymer containing the phosphate group in the above-described specific proportion (0.5–60 mass %) is obtained.

If the proportion of the specific phosphate group-containing monomer in the whole monomer mixture is lower than 3 mass %, it is difficult to obtain the specific acrylic copolymer in which the metal ions is uniformly dispersed. Therefore, the resulting optical material becomes insufficient to absorb rays within the specific wavelength ranges by the metal ions such as the neodymium ion and the like. If the proportion of the specific phosphate group-containing monomer in the whole monomer mixture exceeds 90 mass % on the other hand, the resulting monomer mixture becomes too high in viscosity, so that it is difficult to uniformly dissolve or disperse the metal compounds such as the neodymium compound and the like in such a monomer mixture. In addition, the resulting acrylic copolymer will come to have high hygroscopicity. It is hence not preferable to use the specific phosphate group-containing monomer in any proportion outside the above range.

The specific acrylic copolymer can be obtained by radical-polymerizing the monomer mixture composed of the specific phosphate group-containing monomers and the copolymerizable monomer.

No particular limitation is imposed on the radical polymerization process employed. Any known process making use of a usual radical polymerization initiator, such as bulk (cast) polymerization, suspension polymerization, emulsion polymerization or solution polymerization, may be used.

As examples of a process for containing the metal ions in the polymer (the specific acrylic copolymer) constituting the plastic optical material according to the present invention, may be mentioned the following processes:

(1) a process comprising adding the metal compounds, which are sources of the metal ions, to the monomer mixture prior to the radical polymerization of the monomer mixture into a solution, thereby preparing a monomer composition composed of the metal compounds, the specific phosphate group-containing monomer and the copolymerizable monomer, and subjecting this monomer composition to a radical-polymerizing treatment; and (2) a process comprising adding the metal compounds, which are sources of the metal ions, to an acrylic copolymer obtained by radical-polymerizing the monomer mixture and mixing them.

In the process (2), specifically, there may be used (a) a process in which the acrylic copolymer is heated and melted, and the metal compounds are added to the melt to mix them, (b) a process in which the acrylic copolymer is dissolved in an organic solvent or the like, and the metal compounds are added to this solution to mix them, or the like.

The present invention will hereinafter be described with reference to the following Examples. However, this invention is not limited to and by these Examples. Incidentally, all designations of "part" or "parts" as will be used in the following Examples mean part or parts by mass.

EXAMPLE 1

A specific phosphate group-containing monomer (hereinafter referred to as "Monomer (M1)") represented by the following formula II in an amount of 37.5 parts and a specific phosphate group-containing monomer (hereinafter referred to as "Monomer (M2)") represented by the following formula III in an amount of 22.5 parts were thoroughly mixed with 39 parts of methyl methacrylate and 1 part of α-methylstyrene, thereby preparing a monomer mixture.

Added to this monomer mixture were 9 parts of neodymium acetate monohydrate (containing a trivalent neodymium ion in a proportion of 3.8 parts per 100 parts of the monomer mixture) and 3.6 parts of praseodymium acetate dihydrate (containing a trivalent praseodymium ion in a proportion of 1.5 parts per 100 parts of the monomer mixture), and the resultant mixture was thoroughly stirred and mixed, thereby preparing a monomer composition. A ratio of the trivalent neodymium ion to the trivalent praseodymium ion in this monomer composition was 2.5.

  (Formula II)

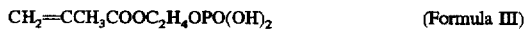  (Formula III)

Added to the thus-prepared monomer composition were 2.0 parts of t-butyl peroxyneodecanoate. The resultant mixture was heated at 45° C. for 2 hours and then at 50° C. for 2 hours. The thus-heated mixture was further heated from 50° C. to 60° C. over 6 hours, from 60° C. to 80° C. over 5 hours and then from 80° C. to 100° C. over 3 hours. The mixture was held at 100° C. for 2 hours to conduct cast polymerization, thereby producing a transparent plastic optical material in the form of a plate 3 mm thick, which was composed of a crosslinked acrylic copolymer containing the trivalent neodymium ion and the trivalent praseodymium ion.

EXAMPLE 2

The Monomer (M1) in an amount of 56.3 parts and the Monomer (M2) in an amount of 33.7 parts were thoroughly mixed with 9 parts of methyl methacrylate and 1 part of α-methylstyrene, thereby preparing a monomer mixture.

Added to this monomer mixture were 18 parts of neodymium acetate monohydrate (containing a trivalent neodymium ion in a proportion of 7.6 parts per 100 parts of the monomer mixture) and 7.2 parts of praseodymium acetate dihydrate (containing a trivalent praseodymium ion in a proportion of 2.9 parts per 100 parts of the monomer mixture), and the resultant mixture was thoroughly stirred and mixed, thereby preparing a monomer composition. A ratio of the trivalent neodymium ion to the trivalent praseodymium ion in this monomer composition was 2.6.

This monomer composition was used to conduct cast polymerization in the same manner as in Example 1, thereby producing a transparent plastic optical material in the form of a plate 3 mm thick.

EXAMPLE 3

The Monomer (M1) in an amount of 1.9 parts and the Monomer (M2) in an amount of 1.1 parts were thoroughly mixed with 70 parts of methyl methacrylate, 26 parts of phenoxyethyl methacrylate and 1 part of α-methylstyrene, thereby preparing a monomer mixture.

Added to this monomer mixture were 0.71 parts of neodymium acetate monohydrate (containing a trivalent neodymium ion in a proportion of 0.3 parts per 100 parts of the monomer mixture) and 0.29 parts of praseodymium acetate dihydrate (containing a trivalent praseodymium ion in a proportion of 0.1 parts per 100 parts of the monomer mixture), and the resultant mixture was thoroughly stirred and mixed, thereby preparing a monomer composition. A ratio of the trivalent neodymium ion to the trivalent praseodymium ion in this monomer composition was 3.0.

This monomer composition was used to conduct cast polymerization in the same manner as in Example 1, thereby producing a transparent plastic optical material in the form of a plate 7.2 mm thick.

EXAMPLE 4

The Monomer (M1) in an amount of 37.5 parts and the Monomer (M2) in an amount of 22.5 parts were thoroughly mixed with 19 parts of phenoxyethyl methacrylate, 20 parts of 2-hydroxyethyl methacrylate and 1 part of α-methylstyrene, thereby preparing a monomer mixture.

Added to this monomer mixture were 5.88 parts of neodymium acetate monohydrate (containing a trivalent neodymium ion in a proportion of 2.5 parts per 100 parts of the monomer mixture) and 6.28 parts of praseodymium acetate dihydrate (containing a trivalent praseodymium ion in a proportion of 2.5 parts per 100 parts of the monomer mixture), and the resultant mixture was thoroughly stirred and mixed, thereby preparing a monomer composition. A ratio of the trivalent neodymium ion to the trivalent praseodymium ion in this monomer composition was 1.0.

This monomer composition was used to conduct cast polymerization in the same manner as in Example 1, thereby producing a transparent plastic optical material in the form of a plate 3 mm thick.

EXAMPLE 5

The Monomer (M1) in an amount of 37.5 parts and the Monomer (M2) in an amount of 22.5 parts were thoroughly mixed with 19 parts of phenoxyethyl methacrylate, 20 parts of 2-hydroxyethyl methacrylate and 1 part of α-methylstyrene, thereby preparing a monomer mixture.

Added to this monomer mixture were 7.76 parts of neodymium acetate monohydrate (containing a trivalent neodymium ion in a proportion of 3.3 parts per 100 parts of the monomer mixture) and 4.27 parts of praseodymium acetate dihydrate (containing a trivalent praseodymium ion in a proportion of 1.7 parts per 100 parts of the monomer mixture), and the resultant mixture was thoroughly stirred and mixed, thereby preparing a monomer composition to produce a transparent plastic optical material in the form of a plate 3 mm thick. A ratio of the trivalent neodymium ion to the trivalent praseodymium ion in this monomer composition was 1.9.

EXAMPLE 6

The Monomer (M1) in an amount of 37.5 parts and the Monomer (M2) in an amount of 22.5 parts were thoroughly mixed with 19 parts of phenoxyethyl methacrylate, 20 parts of 2-hydroxyethyl methacrylate and 1 part of α-methylstyrene, thereby preparing a monomer mixture.

Added to this monomer mixture were 11.76 parts of neodymium acetate monohydrate (containing a trivalent neodymium ion in a proportion of 5.0 parts per 100 parts of the monomer mixture) and 2.51 parts of praseodymium acetate dihydrate (containing a trivalent praseodymium ion in a proportion of 1.0 part per 100 parts of the monomer mixture), and the resultant mixture was thoroughly stirred and mixed, thereby preparing a monomer composition to produce a transparent plastic optical material in the form of a plate 3 mm thick. A ratio of the trivalent neodymium ion to the trivalent praseodymium ion in this monomer composition was 5.0.

EXAMPLE 7

The Monomer (M1) in an amount of 37.5 parts and the Monomer (M2) in an amount of 22.5 parts were thoroughly mixed with 19 parts of phenoxyethyl methacrylate, 20 parts of 2-hydroxyethyl methacrylate and 1 part of α-methylstyrene, thereby preparing a monomer mixture.

Added to this monomer mixture were 10.59 parts of neodymium acetate monohydrate (containing a trivalent neodymium ion in a proportion of 4.6 parts per 100 parts of the monomer mixture) and 1.26 parts of praseodymium acetate dihydrate (containing a trivalent praseodymium ion in a proportion of 0.5 parts per 100 parts of the monomer mixture), and the resultant mixture was thoroughly stirred and mixed, thereby preparing a monomer composition to produce a transparent plastic optical material in the form of a plate 3 mm thick. A ratio of the trivalent neodymium ion to the trivalent praseodymium ion in this monomer composition was 9.2.

EXAMPLE 8

The Monomer (M1) in an amount of 37.5 parts and the Monomer (M2) in an amount of 22.5 parts were thoroughly mixed with 19 parts of phenoxyethyl methacrylate, 20 parts of 2-hydroxyethyl methacrylate and 1 part of α-methylstyrene, thereby preparing a monomer mixture.

Added to this monomer mixture were 10.59 parts of neodymium acetate monohydrate (containing a trivalent neodymium ion in a proportion of 4.6 parts per 100 parts of the monomer mixture) and 1.01 parts of praseodymium acetate dihydrate (containing a trivalent praseodymium ion in a proportion of 0.4 parts per 100 parts of the monomer mixture), and the resultant mixture was thoroughly stirred and mixed, thereby preparing a monomer composition to produce a transparent plastic optical material in the form of a plate 3 mm thick. A ratio of the trivalent neodymium ion to the trivalent praseodymium ion in this monomer composition was 11.5.

EXAMPLE 9

The Monomer (M1) in an amount of 37.5 parts and the Monomer (M2) in an amount of 22.5 parts were thoroughly mixed with 19 parts of phenoxyethyl methacrylate, 20 parts of 2-hydroxyethyl methacrylate and 1 part of α-methylstyrene, thereby preparing a monomer mixture.

Added to this monomer mixture were 7.06 parts of neodymium acetate monohydrate (containing a trivalent neodymium ion in a proportion of 3.0 parts per 100 parts of the monomer mixture) and 3.77 parts of holmium acetate tetrahydrate (containing a trivalent holmium ion in a proportion of 1.5 parts per 100 parts of the monomer mixture), and the resultant mixture was thoroughly stirred and mixed, thereby preparing a monomer composition to produce a transparent plastic optical material in the form of a plate 3 mm thick. A ratio of the trivalent neodymium ion to the trivalent holmium ion in this monomer composition was 2.0.

EXAMPLE 10

The Monomer (M1) in an amount of 37.5 parts and the Monomer (M2) in an amount of 22.5 parts were thoroughly mixed with 19 parts of phenoxyethyl methacrylate, 20 parts of 2-hydroxyethyl methacrylate and 1 part of α-methylstyrene, thereby preparing a monomer mixture.

Added to this monomer mixture were 7.06 parts of neodymium acetate monohydrate (containing a trivalent neodymium ion in a proportion of 3.0 parts per 100 parts of the monomer mixture), 2.51 parts of praseodymium acetate dihydrate (containing a trivalent praseodymium ion in a proportion of 1.0 part per 100 parts of the monomer mixture) and 1.26 parts of holmium acetate tetrahydrate (containing a trivalent holmium ion in a proportion of 0.5 parts per 100 parts of the monomer mixture), and the resultant mixture was thoroughly stirred and mixed, thereby preparing a monomer composition to produce a transparent plastic optical material in the form of a plate 3 mm thick. A ratio of the trivalent neodymium ion to the total of the trivalent praseodymium ion and the trivalent holmium ion in this monomer composition was 2.0.

COMPARATIVE EXAMPLE 1

The Monomer (M1) in an amount of 37.5 parts and the Monomer (M2) in an amount of 22.5 parts were thoroughly mixed with 20 parts of methyl methacrylate, 19 parts of phenoxyethyl methacrylate and 1 part of α-methylstyrene, thereby preparing a monomer mixture.

Added to this monomer mixture were 16.7 parts of neodymium acetate monohydrate (containing a trivalent neodymium ion in a proportion of 7.1 parts per 100 parts of the monomer mixture), and the resultant mixture was thoroughly stirred and mixed, thereby preparing a monomer composition to produce a transparent plastic optical material in the form of a plate 3 mm thick.

The formulations of the respective monomers and metal ions in the monomer compositions prepared in the above Examples 1–10 and Comparative Examples 1–3 are given collectively in following Table 1.

TABLE 1

|  | Example |  |  |  |  |  |  |  |  |  | Comparative Example |  |  |
|---|---|---|---|---|---|---|---|---|---|---|---|---|---|
|  | 1 | 2 | 3 | 4 | 5 | 6 | 7 | 8 | 9 | 10 | 1 | 2 | 3 |
| Monomer (part) | | | | | | | | | | | | | |
| Monomer (M1) | 37.5 | 56.3 | 1.9 | 37.5 | 37.5 | 37.5 | 37.5 | 37.5 | 37.5 | 37.5 | 37.5 | 37.5 | 37.5 |
| Monomer (M2) | 22.5 | 33.7 | 1.1 | 22.5 | 22.5 | 22.5 | 22.5 | 22.5 | 22.5 | 22.5 | 22.5 | 22.5 | 22.5 |
| Methyl methacrylate | 39 | 9 | 70 | | | | | | | | 20 | 20 | 20 |
| Phenoxyethyl methacrylate | | | 26 | 19 | 19 | 19 | 19 | 19 | 19 | 19 | 19 | 19 | 19 |
| 2-Hydroxyethyl methacrylate | | | | 20 | 20 | 20 | 20 | 20 | 20 | 20 | | | |
| α-methylstyrene | 1 | 1 | 1 | 1 | 1 | 1 | 1 | 1 | 1 | 1 | 1 | 1 | 1 |
| Total amount of monomers | 100 | 100 | 100 | 100 | 100 | 100 | 100 | 100 | 100 | 100 | 100 | 100 | 100 |
| Metal ion (part) | | | | | | | | | | | | | |
| Neodymium ion ($Nd^{3+}$) | 3.8 | 7.6 | 0.3 | 2.5 | 3.3 | 5.0 | 4.6 | 4.6 | 3.0 | 3.0 | 7 | | |
| Praseodymium ion ($Pr^{3+}$) | 1.5 | 2.9 | 0.1 | 2.5 | 1.7 | 1.0 | 0.5 | 0.4 | | 1.0 | | 6.8 | |
| Holmium ion ($Ho^{3+}$) | | | | | | | | | 1.5 | 0.5 | | | 6.7 |
| Total amount of metal ions | 5.3 | 10.5 | 0.4 | 5.0 | 5.0 | 6.0 | 5.1 | 5.0 | 4.5 | 4.5 | 7.1 | 6.8 | 6.7 |
| ($Nd^{3+}$)/{($Pr^{3+}$) + ($Ho^{3+}$)} | 2.5 | 2.6 | 3.0 | 1.0 | 1.9 | 5.0 | 9.2 | 11.5 | 2.0 | 2.0 | — | 0 | 0 |

This comparative example shows that the optical material obtained contains the neodymium ion, but includes neither praseodymium ion nor holmium ion.

COMPARATIVE EXAMPLE 2

The Monomer (M1) in an amount of 37.5 parts and the Monomer (M2) in an amount of 22.5 parts were thoroughly mixed with 20 parts of methyl methacrylate, 19 parts of phenoxyethyl methacrylate and 1 part of α-methylstyrene, thereby preparing a monomer mixture.

Added to this monomer mixture were 16.7 parts of praseodymium acetate dihydrate (containing a trivalent praseodymium ion in a proportion of 6.8 parts per 100 parts of the monomer mixture), and the resultant mixture was thoroughly stirred and mixed, thereby preparing a monomer composition to produce a transparent plastic optical material in the form of a plate 3 mm thick.

This comparative example shows that the optical material obtained contains the praseodymium ion, but includes neither neodymium ion nor holmium ion.

COMPARATIVE EXAMPLE 3

The Monomer (M1) in an amount of 37.5 parts and the Monomer (M2) in an amount of 22.5 parts were thoroughly mixed with 20 parts of methyl methacrylate, 19 parts of phenoxyethyl methacrylate and 1 part of α-methylstyrene, thereby preparing a monomer mixture.

Added to this monomer mixture were 16.7 parts of holmium acetate tetrahydrate (containing a trivalent holmium ion in a proportion of 6.7 parts per 100 parts of the monomer mixture), and the resultant mixture was thoroughly stirred and mixed, thereby preparing a monomer composition to produce a transparent plastic optical material in the form of a plate 3 mm thick.

This comparative example shows that the optical material obtained contains the holmium ion, but includes neither neodymium ion nor praseodymium ion.

<Evaluation of Plastic Optical Material>

With respect to the plastic optical materials according to Examples 1–10 and Comparative Examples 1–3, light absorptivities in three specific wavelength ranges and hues were determined in accordance with the following methods to evaluate their tint and glare-proofness.

[Light Absorptivity]

A spectral transmittance curve of each sample in a wavelength range of 300–800 nm was determined by means of an autographic spectrophotometer "U-4000" (manufactured by Hitachi Ltd.), and a spectral transmittance curve of an optical material for control, which was produced without containing any metal ion, was also determined in like manner.

Areas corresponding to light absorption in a wavelength range of red at 550–600 nm, a wavelength range of green at 500–550 nm and a wavelength range of blue at 425–475 nm on the chart of the thus-obtained spectral transmittance curve of the sample were separately determined, thereby calculating a percentage of each of the areas found to an area corresponding to light transmission in its corresponding wavelength range as to the control optical material. In addition, an average value of the light absorptivities in these three wavelength ranges was calculated.

[Hue]

A calorimetric color difference meter "CR-300" (manufactured by MINOLTA CAMERA CO., LTD.) was used to determine $a^*$ and $b^*$ of each sample on the basis of an $L^* a^* b^*$ color space. Here, $a^*$ and $b^*$ denote a hue and a degree of the hue, respectively. The values of $a^*$ and $b^*$ nearer 0 respectively indicate that the sample is closer to colorlessness.

The degree of coloring $C^*$ of the sample was also determined in accordance with the following equation. In the case where this $C^*$ value falls within a range of 0–12, the sample is felt to be colorless or light-colored. In the case of 12–30, it is felt to be colored to a medium degree. In the case where the value exceeds 30, it is felt to be colored very deeply.

$$C^* = [(a^*)^2 + (b^*)^2]^{1/2}$$

[Tint]

Each sample was visually observed under sunlight and judged.

[Glare-proofness]

Determined was a light absorptivity of a glare-proof glass lens "NEO" (product of HOYA Corporation), as a referential example, to which the light absorptivity of a sample in a wavelength range of red was compared. Any optical material whose light absorptivity in the wavelength range of red is not lower than the value in the referential example is judged to have glare-proofness.

The results of the above determination and evaluation are shown in following Table 2.

[Testing Method]

Ten subjects were chosen and separately got to conduct an operation such as preparation of documents and graphs by means of a personal computer equipped with a color display over 2 hours in total, for the first one hour of which the operation was conducted without the spectacles, and for the remaining one hour of which the operation was successively carried out with the spectacles, in a state that a distance between the color display and the eyes of the subject was set within 60–80 cm. The practical effect of the spectacles was evaluated in the following methods.

[Evaluating Methods]

Evaluation Item 1

After 1 hour from the beginning of the operation, the subject was got to put on the spectacles while looking at a

TABLE 2

|  | Light absorptivity (%) | | | | Hue | | | | Thickness |
|---|---|---|---|---|---|---|---|---|---|
|  | Wave-length range of red | Wave-length range of green | Wave-length range of blue | Average value | a* | b* | c* | Tint | (mm) |
| Example | | | | | | | | | |
| 1 | 32.8 | 13.2 | 15.9 | 20.6 | +0.9 | +2.7 | 2.8 | Colorless | 3.0 |
| 2 | 46.4 | 23.6 | 31.9 | 34.0 | +4.5 | +11.0 | 11.9 | Pale yellow | 3.0 |
| 3 | 8.4 | 2.7 | 2.7 | 4.6 | 0.0 | +0.9 | 0.9 | Colorless | 7.2 |
| 4 | 27.7 | 8.0 | 23.3 | 19.7 | −3.7 | +10.5 | 11.1 | Pale yellow | 3.0 |
| 5 | 33.2 | 12.6 | 19.8 | 21.9 | −0.3 | +4.5 | 4.5 | Colorless | 3.0 |
| 6 | 38.8 | 19.0 | 15.9 | 24.6 | +4.3 | −0.2 | 4.3 | Colorless | 3.0 |
| 7 | 36.3 | 16.2 | 9.1 | 20.5 | +5.4 | −4.6 | 7.1 | Pale purple | 3.0 |
| 8 | 37.3 | 17.0 | 9.0 | 21.1 | +6.0 | −6.1 | 8.5 | Pale purple | 3.0 |
| 9 | 26.3 | 11.4 | 10.4 | 16.0 | +3.3 | −1.7 | 3.7 | Colorless | 3.0 |
| 10 | 29.9 | 11.9 | 14.5 | 18.8 | +0.7 | +2.9 | 3.0 | Colorless | 3.0 |
| Comp. Ex. | | | | | | | | | |
| 1 | 45.7 | 24.2 | 6.7 | 25.5 | +8.8 | −9.0 | 12.6 | Deep purple | 3.0 |
| 2 | 15.3 | 0.8 | 57.6 | 24.6 | −16.7 | +47.8 | 50.7 | Extremely deep yellow | 3.0 |
| 3 | 0.1 | 7.1 | 26.7 | 11.3 | −0.6 | +18.0 | 18.0 | Deep orange | 3.0 |
| Ref. ex. | 8.1 | 1.6 | 0.8 | 3.5 | −1.2 | −1.9 | 2.7 | Colorless | 1.8 |

As apparent from Table 2, it was confirmed that the optical materials according to Examples 1–10 had excellent glare-proofness, and were well balanced among light absorptivities in the wavelength ranges of red, green and blue, low in the degree of coloring and hence almost colorless.

On the contrary, the optical materials according to Comparative Examples 1 and 2 had glare-proofness, but were high in the degree of coloring by the neodymium ion and the praseodymium ion, respectively. Further, the optical material according to Comparative Example 3 failed to attain sufficient glare-proofness because it contained neither neodymium ion nor praseodymium ion and was high in the degree of coloring by the holmium ion.

TEST EXAMPLE 1

A monomer composition prepared in the same manner as in Example 1 was used to conduct cast polymerization according to Example 1, thereby producing plain optical members in the form of a lens or powerless lens 2 mm thick. The optical members were set in the frames of spectacles, and the performance of the spectacles was evaluated in the following manner.

picture, and whether reduction in the degrees of glare and flickering of the picture could be clearly recognized in that moment by the wearing of the spectacles or not was judged by the subject, thereby ranking the effect of the spectacles as "Effective" where the reduction was recognized or "Ineffective" where no reduction was recognized.

Evaluation Item 2

Whether the subject felt or not while conducting the operation with the spectacles that the degrees of glare and flickering of the picture are reduced as compared with the case where the operation was conducted without the spectacles was judged by the subject, thereby ranking the effect of the spectacles as "Effective" the subject felt reduced or "Ineffective" where the subject did not feel reduced.

Evaluation Item 3

After 2 hours from the beginning or at ending of the operation, the subject was got to take off the spectacles while looking at the picture, and whether increase in the degrees of glare and flickering of the picture could be clearly recognized in that moment by taking off the spectacles or not was judged by the subject, thereby ranking the effect of the spectacles as "Effective" where the increase was recognized or "Ineffective" where no increase was recognized.

Evaluation Item 4

After completion of the whole operation, the subject was got to compare the case where the operation was conducted without the spectacles with the case the operation was conducted with the spectacles, and whether the subject felt or not that the fatigue of subject's eyes is lessened when the operation is conducted with the spectacles was judged by the subject, thereby ranking the effect of the spectacles as "Effective" where the subject felt lessened or "Ineffective" where the subject did not felt lessened.

The numbers of persons who judged to be "Effective" and "Ineffective", respectively, in the above evaluation items are shown in Table 3.

TABLE 3

|  | Effective (number) | Ineffective (number) |
|---|---|---|
| Evaluation item 1 | 10 | 0 |
| Evaluation item 2 | 9 | 1 |
| Evaluation item 3 | 10 | 0 |
| Evaluation item 4 | 9 | 1 |

TEST EXAMPLE 2

A monomer composition prepared in the same manner as in Example 1 was used to conduct cast polymerization according to Example 1, thereby producing a glare-proof filter for a cathode-ray tube display in the form of a plate 200 mm in length by 300 mm in breadth by 2 mm in thickness. The performance of the filter was evaluated in the following manner.

[Testing Method]

Ten subjects were chosen and separately got to conduct an operation such as preparation of documents and graphs by means of a personal computer equipped with a color display over 2 hours in total, for the first one hour of which the operation was conducted without fitting the filter to the display, and for the remaining one hour of which the operation was successively carried out with the filter fitted to the display, in a state that a distance between the color display and the eyes of the subject was set within 60–80 cm. The practical effect of the filter was evaluated in the following methods.

[Evaluating Methods]

Evaluation Item 1

After 1 hour from the beginning of the operation, the filter was fitted to the display while looking at a picture, and whether reduction in the degrees of glare and flickering of the picture could be clearly recognized in that moment by the fitting of the filter or not was judged by the subject, thereby ranking the effect of the filter as "Effective" where the reduction was recognized or "Ineffective" where no reduction was recognized.

Evaluation Item 2

Whether the subject felt or not while conducting the operation with the filter fitted to the display that the degrees of glare and flickering of the picture are reduced as compared with the case where the operation was conducted without fitting the filter to the display was judged by the subject, thereby ranking the effect of the filter as "Effective" the subject felt reduced or "Ineffective" where the subject did not feel reduced.

Evaluation Item 3

After 2 hours from the beginning or at ending of the operation, the filter was take out of the display while looking at the picture, and whether increase in the degrees of glare and flickering of the picture could be clearly recognized in that moment by the removal of the filter or not was judged by the subject, thereby ranking the effect of the filter as "Effective" where the increase was recognized or "Ineffective" where no increase was recognized.

Evaluation Item 4

After completion of the whole operation, the subject was got to compare the case where the operation was conducted without fitting the filter to the display with the case the operation was conducted with the filter fitted to the display, and whether the subject felt or not that the fatigue of subject's eyes is lessened when the operation is conducted with the filter fitted to the display was judged by the subject, thereby ranking the effect of the filter as "Effective" where the subject felt lessened or "Ineffective" where the subject did not felt lessened.

The numbers of persons who judged to be "Effective" and "Ineffective", respectively, in the above evaluation items are shown in Table 4.

TABLE 4

|  | Effective (number) | Ineffective (number) |
|---|---|---|
| Evaluation item 1 | 10 | 0 |
| Evaluation item 2 | 10 | 0 |
| Evaluatian item 3 | 10 | 0 |
| Evaluation item 4 | 10 | 0 |

It is apparent from the above results that the plastic optical materials according to the present invention are practically useful as glare-proof spectacle lenses and glare-proof filters for display devices.

What is claimed is:

1. A plastic optical material comprising a polymer containing a phosphate group and a trivalent neodymium ion therein, wherein the polymer further contains at least one metal ion selected from the group consisting of a trivalent praseodymium ion and a trivalent holmium ion; and wherein the phosphate group is chemically bonded to a molecular structure constituting the polymer.

2. The plastic optical material according to claim 1, wherein the polymer is a copolymer obtained by copolymerizing a monomer represented by the following formula I and at least one monomer copolymerizable therewith:

$$PO(OH)_n R_{3-n} \quad \text{(Formula I)}$$

wherein R means a polymerizable functional group represented by the formula:

$$-(OC_2H_4)_m O-\underset{\underset{O}{\|}}{C}-\underset{\underset{X}{|}}{C}=CH_2$$

in which X denotes a hydrogen atom or a methyl group, and m is an integer of 0–5, and n is 1 or 2.

3. The plastic optical material according to claim 1, wherein the total content of the trivalent neodymium ion, the trivalent praseodymium ion and the trivalent holmium ion is 0.1–13 parts by mass per 100 parts by mass of the polymer.

4. The plastic optical material according to claim 1, wherein a mass ratio of the neodymium ion to the total mass of the trivalent praseodymium ion and the trivalent holmium ion is 0.5–12.

5. A glare-proof spectacle lens which is composed of the plastic optical material according to claim 1.

6. A glare-proof spectacle lens which is composed of the plastic optical material according to claim 2.

7. A glare-proof spectacle lens which is composed of the plastic optical material according to claim 3.

8. A glare-proof spectacle lens which is composed of the plastic optical material according to claim 4.

9. A glare-proof filter which is composed of the plastic optical material according to claim 1.

10. A glare-proof filter which is composed of the plastic optical material according to claim 2.

11. A glare-proof filter which is composed of the plastic optical material according to claim 3.

12. A glare-proof filter which is composed of the plastic optical material according to claim 4.

* * * * *